United States Patent [19]

Pischke et al.

[11] Patent Number: 4,971,360
[45] Date of Patent: Nov. 20, 1990

[54] HEIGHT ADJUSTMENT SYSTEM FOR A VEHICLE WITH AIR SUSPENSION

[75] Inventors: Jürgen Pischke, Weissach; Engelbert Tillhon, Lauffen; Matthias Fahrnschon, Landau; Helmut Zehaczek, Eberstadt, all of Fed. Rep. of Germany

[73] Assignee: Robert Bosch GmbH, Stuttgart, Fed. Rep. of Germany

[21] Appl. No.: 411,453

[22] PCT Filed: Apr. 8, 1988

[86] PCT No.: PCT/EP88/00295
§ 371 Date: Sep. 15, 1989
§ 102(e) Date: Sep. 15, 1989

[87] PCT Pub. No.: WO89/09701
PCT Pub. Date: Oct. 19, 1989

[51] Int. Cl.$^5$ .................................... B60G 17/00
[52] U.S. Cl. .................................... 280/840; 280/707; 280/708; 280/DIG. 1
[58] Field of Search ............... 280/707, 840, 705, 708, 280/DIG. 1

[56] References Cited

U.S. PATENT DOCUMENTS 4,696,489 9/1987 Fujishiro et al. ................... 280/707

FOREIGN PATENT DOCUMENTS 91017 10/1983 European Pat. Off. .
224036 6/1987 European Pat. Off. .
262572 4/1988 European Pat. Off. .
191803 3/1984 Japan .

*Primary Examiner*—Kenneth R. Rice
*Attorney, Agent, or Firm*—Michael J. Striker

[57] ABSTRACT

A height adjustment system for a vehicle including a solenoid valve arrangement that controls air flow to and from an air spring of an air suspension arranged between a vehicle body and a wheel axle, a sensor unit for determining a height between the vehicle body and the wheel axle and a velocity of vertical movement of the vehicle body relative to the wheel axle, and a control unit that controls operation of the solenoid valve arrangement in accordance with the velocity of vertical movement of the vehicle body relative to the wheel axle as well as a comparison between threshold height values and the distance between the vehicle body and the wheel axle. The air suspension may also be provided with an oscillating damper of substantially constant damping characteristics, such as a shock absorber.

9 Claims, 2 Drawing Sheets

HEIGHT ADJUSTMENT SYSTEM FOR A VEHICLE WITH AIR SUSPENSION

BACKGROUND OF THE INVENTION

The present invention relates to a height adjustment system for an air suspension of a vehicle having an oscillation damper and comprising air springs, solenoid valve means for controlling air flow through the air springs, a distance sensor for sensing the distance between the vehicle body and a respective axle, and control means for controlling operation of the valve means in accordance with the distance. Such a system is known from EP-A-0091017 wherein compressed air is admitted to the air spring when a distance sensor senses that the height of the vehicle body is below a lower threshold, and air is released from the air spring when the distance sensor senses that the body height is above an upper threshold. As a result of frictional forces in the damper, the adjustment travel extends beyond that at closing of the solenoid valve arrangement. An attempt to compensate for this overshoot is made by appropriate choice of the upper and lower thresholds. However, this does not take into account the fact that the amount of overshoot depends also on the velocity of vertical movement of the vehicle body relative to the axle at the instant of closing of the valve arrangement and possibly other factors.

SUMMARY OF THE INVENTION

The object of the invention is to avoid this disadvantage.

The above object is achieved in accordance with the invention, by providing a height adjustment system in which the instant or the height at which the solenoid valve means closes, depends on the velocity of the vertical movement of the vehicle body relative to the vehicle axle. By an appropriate choice of parameters, the range of error in the adjusted height can be substantially reduced.

The invention is readily realized by the use of a characteristic curve stored in a memory. Sufficient accuracy can be obtained by selecting a threshold which is proportional to the velocity of vertical movement of the vehicle body relative to the axle at least over a portion of the characteristic curve, and by providing a characteristic curve which extends from a minimum threshold at which the velocity is within the degree of accuracy of measurement and calculation, to a maximum threshold at which the velocity of vertical movement is at the maximum that can be expected when the available compressed air supply is taken into consideration.

The characteristic curve can be determined empirically or by trial and error.

However, in a particularly advantageous embodiment, the stored characteristic can be corrected or a choice out of a range of stored characteristics can be made. This has the advantage that compensation can be made for changes which occur in the friction and damping characteristics while the vehicle is in use.

The present invention both as to its construction so to its method of operation, together with additional objects and advantages thereof, will be best understood from the following detailed description of the preferred embodiments with reference to the appended drawings.

DETAILED DESCRIPTION OF THE PREFERRED EMBODIMENTS

Figure 1:
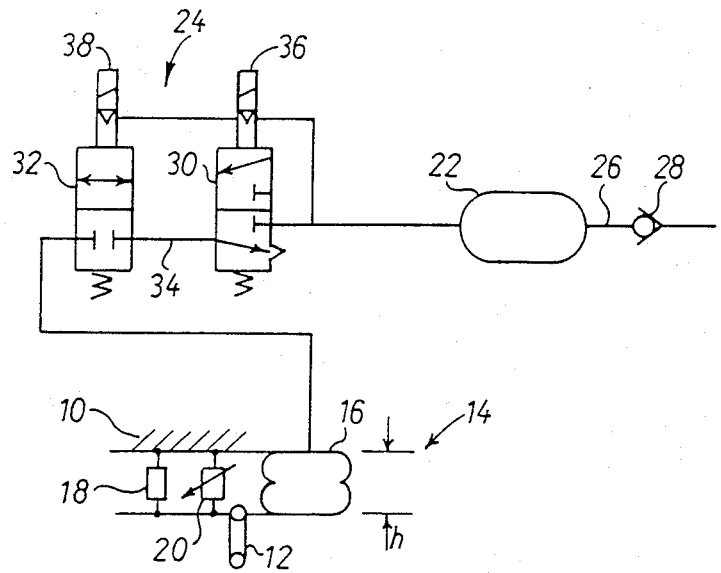
FIG. 1 is a diagram of an air suspension system for a vehicle fitted with a height adjustment system.

FIG. 1 shows diagrammatically a part of a vehicle body 10 attached to an axle 12 by an air suspension 14. The air suspension 14 comprises an air spring bellows 16, an oscillation damper 18 and a height measuring sensor 20, each arranged between the vehicle body 10 and the axle 12. The height measuring sensor 20 can be a simple potentiometer or a variable resistor. The air spring bellows 16 is filled and emptied as required by a compressed air reservoir 22 and a solenoid valve arrangement 24. The reservoir 22 is charged from a compressor (not shown) via a line 26 containing a non-return valve 28. The valve arrangement 24 comprises a 3-port, 2-position valve 30 and a 2-port, 2-position valve 32 in a line 34 between the resevoir 22 and the suspension bellows 16. The valves are spring-biased to their positions shown and are operated by solenoids 36, 38 with the assistance of air pressure from the reservoir 22. Thus, upon failure of the compressed air supply, the valve arrangement 24 cannot be opened. Upon actuation of both valves 30, 32 connects, the air spring bellows 16 is connected to the reservoir 22 in order to feed compressed air to the air suspension 14 and thereby increase the height h of the vehicle body 10 relative to the axle 12. Upon actuation of the valve 32 alone connects, the air spring bellows 16 via the unactuated valve 30 is connected to an exhaust and thereby the height h of the vehicle body 10 is decreased.

Figure 2:
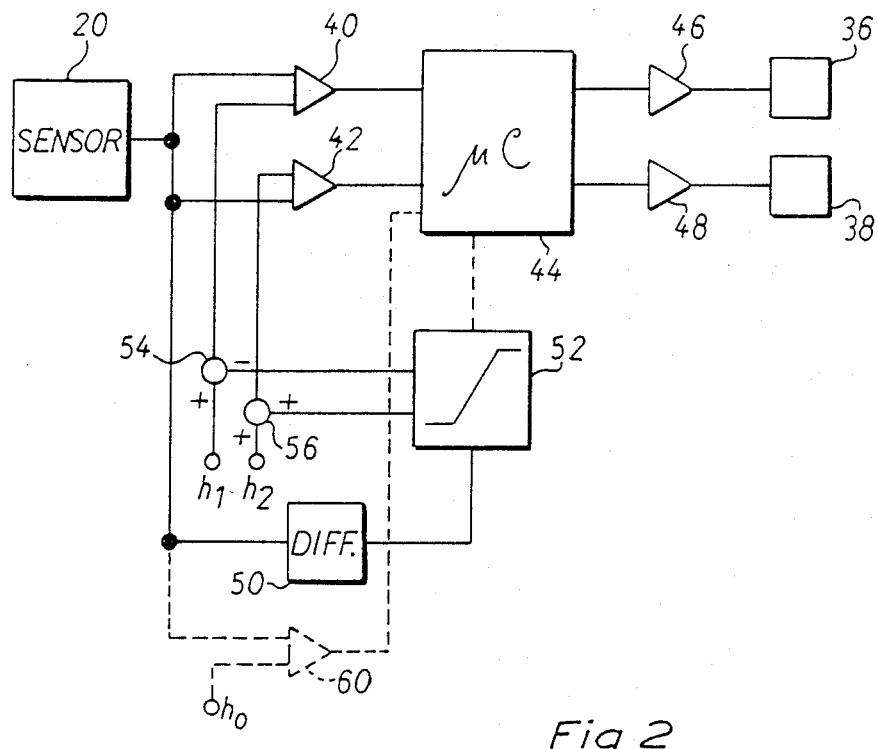
FIG. 2 is a block diagram of the height adjustment system according to the invention.

Referring to FIG. 2, the height sensor 20 is connected to a comparator 40 when the vehicle body need be raised and to comparator 42 when the body need be lowered. The outputs of the comparators 40, 42 are connected to a control computer 44 which energises the valve solenoids 36, 38 via end stage amplifiers 46, 48; respectively. The output h of the height sensor 20 is differentiated in a differentiator 50 to obtain the velocity v of vertical movement of the vehicle body, and this velocity v is fed to a memory zone 52 (which may be part of the computer 44) in which is stored a characteristic curve.

Figure 3:
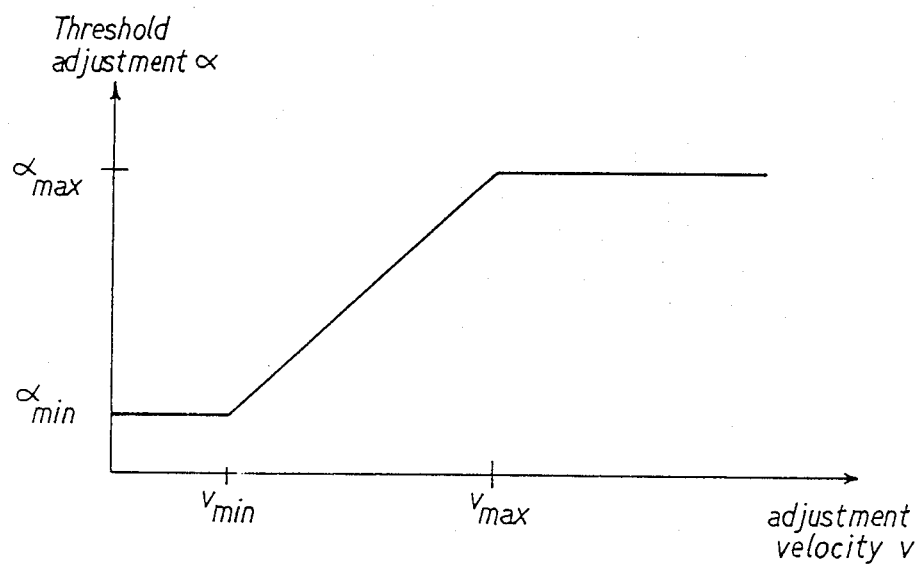
FIG. 3 is a graph showing the characteristic curve stored in a memory of the height adjustment system.

This characteristic curve, which is shown in FIG. 3, gives the amount $\alpha$ by which the switching thresholds for the comparators 40 and 42 must be adjusted to compensate for the frictional forces in the oscillation damper 18. As a first and sufficient approximation, it is supposed that the required threshold adjustment $\alpha$ is directly proportional to the velocity of vertical movement of the vehicle body so that the majority of the characteristic curve is represented by a straight line of a suitable slope. There is a minimum constant adjustment $\alpha_{min}$ at velocities below $V_{min}$ which is determined by the expected errors of measurement and calculation. There is a maximum constant adjustment $\alpha_{max}$ at velocities above $V_{max}$ which is determined by the air pressure in the reservoir 22, the capacity of the air spring bellows 16, and the flow cross-sections of the valves 30, 32 and the air line 34.

At a subtractor 54, the height adjustment $\alpha$ is subtracted from a height value $h_1$ which it is desired to obtain when increasing the body height h from a too low a value. At an adder 56, the height adjustment $\alpha$ is added to a height value $h_2$ which it is desired to obtain when the body height h is decreasing from a too high a value. The outputs of the subtractor 54 and the adder 56 are applied to the reference inputs of the comparators 40 and 42, respectively. Ideally $h_1$ should equal $h_2$ but, in practice, it is necessary to build some hysteresis into the system to avoid an excessive number of readjustment operations. Nevertheless, it is possible to feed the same desired height value $h_0$ to both the subtractor 54 and the adder 56 if the minimum threshold adjustment $\alpha_{min}$ is increased to establish the hysteresis.

Should the sensor 20 measure a vehicle body height h which is too low, the comparator 40 supplies a signal to the computer 44 which energises both valve solenoids 36, 38, whereby compressed air is admitted to the air spring bellows 16. The velocity v of the consequent height adjustment is fed to the memory zone 52 which delivers a threshold adjustment $\alpha$ determined by the stored characteristic curve. The switching off threshold of the comparator 44 is thus adjusted to $h_1 - \alpha$, whereby the computer 44 closes the valves 30, 32 before the desired body height $h_1$(or $h_0$) is reached. The stored characteristic curve is so chosen that the body reaches the desired height $h_1$(or $h_0$) when the frictional forces in the damper 18 have dissipated. Similarly, when the vehicle body height h is measured as being too high, the computer 42 signals the comparator 44 to energise only the solenoid 38 of the valve 32, whereby air from the air spring bellows 16 is discharged. The valve 32 is closed when the height h reaches the switching off threshold $h_2 + \alpha$ to establish the desired body height $h_2$ (or $h_0$) when the frictional forces have dissipated.

Typically, the adjustment velocity can vary between $V_{min} = 5$ mm/sec and $V_{max} = 50$ mm/sec. In the absence of means according to the invention, it would be necessary to choose an average velocity between these values and to determine the switch-off thresholds accordingly, in order to achieve a usable compromise in the event of various values. As a result, the height adjustment falls short of the desired value in the case of low adjustment velocities and overshoots the desired value in the event of high adjustment velocities. As a result, the actual adjustment may depart by $\pm 15$ mm from the desired value. By a suitable choice of a characteristic curve, this departure can be reduced to $\pm 2$ mm when the vehicle is stationary. Due to vehicle oscillations when the vehicle is moving, the deviation from the desired value is increased both with and without the invention, in spite of filtering of the measured height signals from the sensor.

The characteristic curve of FIG. 3 can be established empirically by making measurements of the actual adjustment velocity v and the consequent value of the eventual overshoot when the frictional forces have been overcome or dissipated. Another way is by trial and error. An initial characteristic curve is established arbitrarily and the error in the eventual height adjustment actually produced by the system is noted. The characteristic curve stored in the memory zone is then changed in a sense to reduce this error. The process is then repeated as often as is necessary to bring this error down to an acceptable value. In the trial and error method, the corrected characteristic curve can be stored in a non-volatile memory, to avoid having to correct a fixed characteristic curve each time the system is switched on. There is also the possibility of obtaining suitably accurate characteristic curves for individual systems, e.g., to compensate for differences in flow cross sections of valves and conduits and aging of the damper.

Thus, the invention avoids the need for a compromise which would result from an adjustment to give optimum height regulation at half load and the consequent poorer regulation at smaller and larger loads.

Another possibility is for the computer 44 to be programmed to adjust the characteristic curve stored in the memory zone 52. To this end, as shown in dotted lines, the measured height h is compared with the desired value $h_0$ in a further comparator 60 and the error is fed to the computer 44. If this error is over a predetermined value in the steady state, i.e. in the absence of any signals from either of the comparators 40, 42, a corresponding correcting signal is fed to the memory zone 52 to alter the characteristic curve in the sense that the error will be reduced the next time an adjusting operation takes place. In practice, two oppositely poled comparators 60 would be needed for making corrections in either direction as may be necessary. If a volatile memory 52 is used, the one characteristic curve can be corrected as necessary. An alternative would be to use a non-volatile memory in which a series of characteristic curves is stored, of which only one is used at any given time. In such case, the correcting signal from the computer 44 changes the characteristic curve in use.

The above measures have the advantages that only a single characteristic curve or a single range of characteristic curves must be determined in the first instance and it is possible to compensate for changes which occur in the damping and friction characteristics while the vehicle is in use.

While the invention has been illustrated and described as embodied in a height adjustment system for a vehicle with an air suspension, it is not intended to be limited to the details shown, since various modifications and structural changes may be made without departing in any way from the spirit of the present invention.

Without further analysis, the foregoing will so fully reveal the gist of the present invention that others can, by applying current knowldge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A height adjustment system for a vehicle including a vehicle body, a wheel axle, and an air suspension arranged between the vehicle body and the axle, said air suspension including an oscillation damper for damping motion of said vehicle body relative to said axle and air spring means for controlling a height between the vehicle body and the wheel axle, said height adjustment system comprising valve means for controlling air flow to and from the air spring means; means for determining the distance between the vehicle body and the wheel axle and for determining a velocity of vertical movement of the vehicle body relative to the vehicle axle; and means for controlling operation of said valve means in accordance with the velocity of vertical movement of the vehicle body relative to the wheel axle and with a comparison between threshold height values and the distance between the vehicle body and the wheel axle.

2. A height adjustment system according to claim 1, wherein said controlling means includes a memory for storing a characteristic curve which is representative of a relationship between a height threshold adjustment of said threshold height values and the velocity of vertical movement of the vehicle body relative to the wheel axle, said controlling means influencing the valve means at a predetermined height of the vehicle body with respect to the axle, which height is adjusted by one of said threshold adjustments determined from the velocity of vertical movement in accordance with the characteristic curve.

3. A height adjustment system according to claim 2, wherein the threshold is adjustment proportional to the velocity of vertical movement of the vehicle body relative to the wheel axle at least over a portion of the characteristic curve.

4. A height adjustment system according to claim 2, wherein the characteristic curve in said memory extends from a minimum threshold at which the velocity of vertical movement of the vehicle body relative to the wheel axle is within a degree of accuracy of measurement and calculation, and a maximum threshold at which the velocity of vertical movement of the vehicle body relative to the wheel axle is at a maximum that can be expected with regard to the available compressed air supply.

5. A height adjustment system according to claim 2, wherein the characteristic curve stored in said memory is determined empirically.

6. A height adjustment system according to claim 2, wherein the characteristic curve stored in said memory is determined by trial and error.

7. A height adjustment system according to claim 2, wherein said controlling means is formed to compare an actual height of the vehicle body relative to the wheel axle with the desired height after an adjustment operation and to alter, in the event of an error exceeding a predetermined value, the characteristic curve so as to reduce the error.

8. A height adjustment system according to claim 2, wherein said valve means is formed as solenoid valve means.

9. In a height adjustment system for a vehicle including a vehicle body, a wheel axle, and an air suspension arranged between the vehicle body and the axle, said air suspension including an oscillation damper for damping motion of said vehicle body relative to said axle and air spring means for controlling a height between the vehicle body and the wheel axle, the improvement wherein said height adjustment system includes valve means for controlling air flow to and from the air spring means; means for determining the distance between the vehicle body and the wheel axle and for determining a velocity of vertical movement of the vehicle body relative to the vehicle axle; means for controlling operation of said valve means in accordance with the velocity of vertical movement of the vehicle body relative to the wheel axle and with a comparison between predetermined height values and the distance between the vehicle body and the wheel axle, said controlling means including a memory for storing a characteristic curve which is representative of a relationship between a height threshold adjustment and the velocity of vertical movement of the vehicle body relative to the wheel axle, said controlling means influencing the valve means at a predetermined height of the vehicle body with respect to the axle, which height is adjusted by one of said threshold adjustments determined from the velocity of vertical movement in accordance with the characteristic curve.

* * * * *